(12) United States Patent
von Glasow

(10) Patent No.: US 6,264,339 B1
(45) Date of Patent: Jul. 24, 2001

(54) MAKE-UP MIRROR FOR VEHICLE

(76) Inventor: Christian von Glasow, 11427 High Grove, Houston, TX (US) 77077

( * ) Notice: Subject to any disclaimer, the term of this patent is extended or adjusted under 35 U.S.C. 154(b) by 0 days.

(21) Appl. No.: 09/226,407

(22) Filed: Jan. 6, 1999

(51) Int. Cl.[7] .............................. G02B 7/182; F21V 33/00
(52) U.S. Cl. ....................... 359/872; 359/881; 362/135; 362/140; 362/142; 362/144; 248/476
(58) Field of Search .................................. 359/841, 872, 359/879, 881; 362/135, 136, 137, 140, 142, 143, 144; 248/476, 477, 479

(56) References Cited

U.S. PATENT DOCUMENTS

| | | | |
|---|---|---|---|
| 1,799,545 | * | 4/1931 | Chase . |
| 2,001,743 | * | 5/1935 | Morrison . |
| 2,048,939 | * | 7/1936 | Leathorn . |
| 2,149,598 | * | 3/1939 | Girl et al. . |
| 3,795,422 | * | 3/1974 | Robinson et al. . |
| 4,267,430 | * | 5/1981 | Downey . |
| 4,486,075 | * | 12/1984 | Cohen . |
| 4,557,520 | * | 12/1985 | Simjian . |
| 4,681,366 | * | 7/1987 | Lobanoff . |
| 4,865,380 | * | 9/1989 | Heitzman-Powell et al. . |
| 5,453,915 | * | 9/1995 | Bradley, III . |

* cited by examiner

*Primary Examiner*—Ricky D. Shafer
(74) *Attorney, Agent, or Firm*—Bracewell & Patterson, LLP

(57) ABSTRACT

A make-up or vanity mirror which is adapted to be mounted in a vehicle in such a manner that it may be optimally positioned for use by the driver/passenger without impairing the driver's vision when the vehicle is in motion. The mirror assembly may be added as an aftermarket accessory to existing vehicles or may be installed as original equipment. The mirror is mounted on a flexible extension arm which is secured to a base which may be quickly secured to the posts of the head rest on a typical seat or to another portion of the vehicle. The mirror may include a peripheral lighting system to provide localized illumination. The power source for the lighting system may be self-contained with a battery pack mounted in the clamp base and a wire carried in the interior of the flexible extension arm. It is also possible to house the battery pack directly in the mirror housing. An alternative power source may be provided by extending the wire from the assembly and providing a jack adapted for connecting the wire to a vehicle accessory power socket such as, by way of example, a cigarette lighter socket.

11 Claims, 2 Drawing Sheets

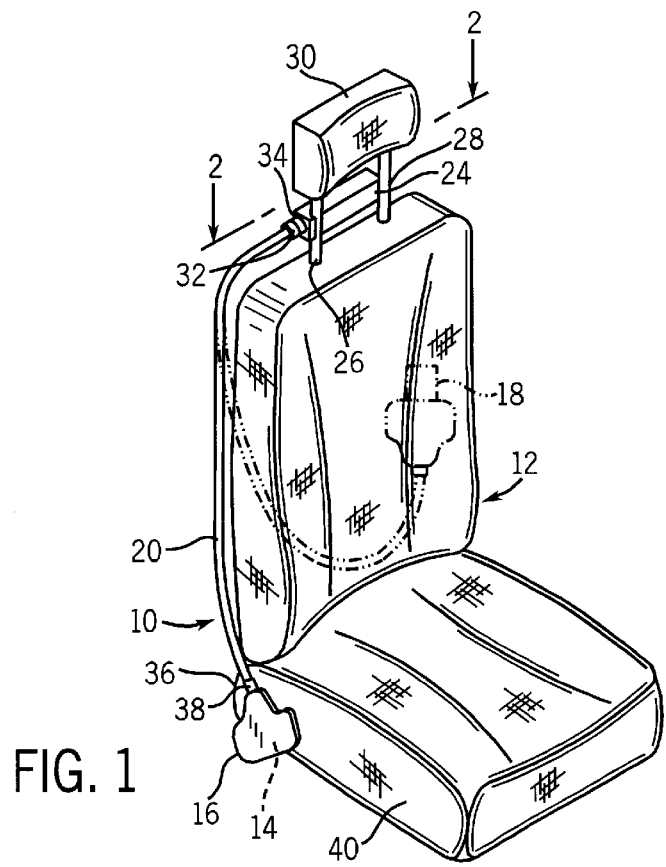
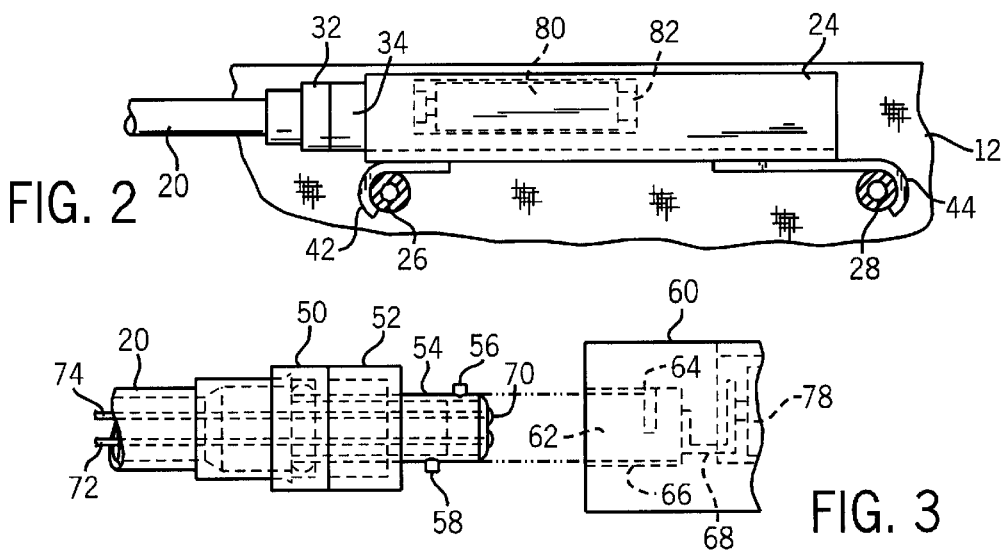

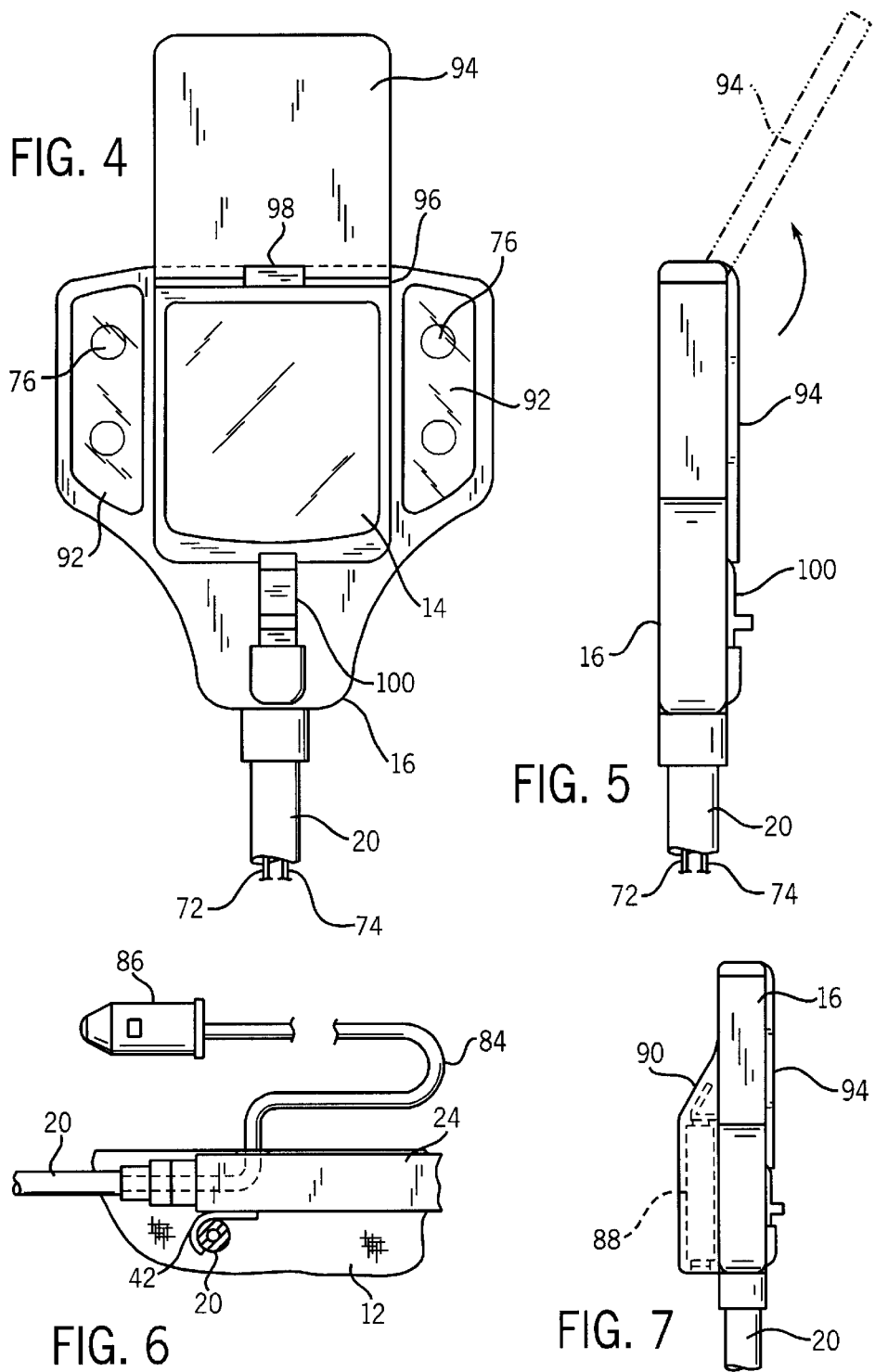

MAKE-UP MIRROR FOR VEHICLE

BACKGROUND OF THE INVENTION

1. Field of the Invention

The subject invention is generally related to adjustable mirrors and is specifically directed to an adjustable mirror assembly for mounting in vehicles.

2. Discussion of the Prior Art

Adjustable mirror assemblies are relatively well-known. Examples of such assemblies are shown and described in U.S. Pat. Nos. 5,566,030; 5,453,915; 5,182,675; 5,105,177; 4,745,528; 3,977,645; 3,392,950 and 2,414,223. Each of these assemblies has a base, an adjustable support attached to the base and a mirror mounted in the adjustable support. In most cases the mirror is mounted for pivotal and/or rotational movement within the adjustable support. The base either is permanently mounted or includes a clamp by which the mirror assembly may be temporarily secured to a structure.

Many automobiles today have mirrors mounted in the sun screen visor positioned above the windshield in front of both the passenger and driver sides of a vehicle. In many cases, these mirrors include sidelights and may be used as vanity or make-up mirrors. While it is not intended that these mirrors be used, particularly by the driver, while the car is in motion, it is not uncommon to see women applying make-up or men shaving and looking into the mirror while driving the vehicle. An even more serious safety hazard is the use of the centrally mounted interior rear-view mirror for this purpose. When the rear-view mirror is used in this manner, it is usually adjusted to accommodate its use as a make-up mirror and its functionality as a rear-view mirror is minimized or altogether eliminated.

In addition, use of either of these types of mirrors as a vanity mirror is less than desirable even when used in a safe and proper manner. Neither mirror is positioned properly for use as a vanity mirror, requiring that the passenger adjust his/her position in the seat in order to use the mirror.

At present, there is a need for a make-up mirror that is convenient, safe to use and adequately adjustable to permit use without discomfort to the passenger or driver of a vehicle.

SUMMARY OF THE INVENTION

The subject invention is directed to a make-up or vanity mirror which is adapted to be mounted in a vehicle in such a manner that it may be optimally positioned for use by the driver/passenger without impairing the driver's vision when the vehicle is in motion. The novel mirror assembly of the invention may be added as an aftermarket accessory to existing vehicles or may be installed as original equipment.

The aftermarket embodiment is a mirror mounted on a flexible extension arm which is secured to a clamp base. The clamp may be quickly secured to the posts of the head rest on a typical seat. In the preferred embodiment, the mirror includes a peripheral lighting system to provide localized illumination. The power source for the lighting system may be self-contained with a battery pack mounted in the clamp base and a wire carried in the interior of the flexible extension arm. It is also possible to house the battery pack directly in the mirror housing. An alternative power source may be provided by extending the wire from the assembly and providing a jack adapted for connecting the wire to a vehicle accessory power socket such as, by way of example, a cigarette lighter socket.

The flexible extension arm is mounted such that it and the mirror may be pivoted from a stowed position adjacent the side of the seat to a use position in front of the face of the driver or passenger. The use position of the mirror may be adjusted to individual preference. The assembly is constructed such that once the individual preference is determined, the mirror will maintain proper alignment with the rest of the assembly once the mirror and arm are returned to the stowed position. This permits the driver/passenger to quickly stow and retrieve the mirror without adjusting if for optimum position each time it is retrieved.

In the preferred embodiment, the on/of switch for the illumination system is located on the mirror case and may be quickly accessed as the mirror is moved between the stowed and use positions. It is also possible to provide an automatic on/off switch wherein the illumination system is activated when the mirror is moved from its stowed position and deactivated when the mirror is returned to the stowed position.

The mirror assembly of the invention may also be secured to the vehicle in other ways without departing from the scope and spirit of the invention. In one alternative embodiment, the base may comprise a bayonet type socket assembly with the socket being mounted at a convenient place on the vehicle such as, by way of example, on the side of the seat or on the console between the seats. The socket may be energized by the automobile power source for providing power to the mirror illumination system.

The mirror assembly may also be permanently mounted in the vehicle as original equipment, either with a self-contained power supply or with a tie-in to the vehicle power supply.

The make-up mirror assembly of the subject invention provides a safe, convenient vanity mirror for use by a driver/passenger of a vehicle without disrupting the use of other mirror functions in the vehicle and without impairing the vision of the driver when the car is in motion.

It is, therefore, an object and feature of the subject invention to provide a make-up mirror for a vehicle which is convenient to use without impairing the vision of the driver when the vehicle is in motion.

It is another object and feature of the invention of the subject invention to provide an aftermarket accessory which may be quickly mounted in the vehicle without the use of special tools.

It is a further object and feature of the subject invention to provide a make-up mirror that is properly positioned relative to the user while seated in a vehicle.

Other objects and features of the invention will be readily apparent from the accompanying drawings and detailed description of the preferred embodiment.

BRIEF DESCRIPTION OF THE DRAWINGS

FIG. 1 is a perspective view of a vehicle seat with the mirror assembly of the subject invention mounted thereon and shown in the stowed position with the use position indicated in phantom.

FIG. 2 is an enlarged partial view looking in the direction of the arrows 2—2 in FIG. 1.

FIG. 3 is an enlarged partial view of an alternative mounting system.

FIG. 4 is an enlarged partial view showing the front of the mirror.

FIG. 5 is a side view of the mirror shown in FIG. 4.

FIG. 6 is a view similar to FIG. 2, showing an alternative power hook-up.

FIG. 7 is a view simal to FIG. 5, with an alternative integral power supply.

DETAILED DESCRIPTION OF THE PREFERRED EMBODIMENTS

The mirror assembly 10 of the subject invention is shown mounted on a typical vehicle seat 12. In the embodiment shown in FIG. 1, the mirror 14 (not visible, see FIG. 4) is carried in a housing 16, with a flip cover 18 that protects the mirror when in the stowed position of FIG. 1. The housing 16 is mounted on an extension arm 20 which in turn is mounted on a base 24. In this embodiment the base 24 is secured to the posts 26, 28 of the standard headrest 30 of the seat 12. The extension arm 20 has a base end 32 which is mounted for rotation about its axis at mount 34 of the base. The mirror case 16 is mounted at 38 for rotation about the axis of the extension arm 20 on the mirror end 36 of the arm. When in the stowed position shown, the mirror case and arm are positioned out of the way of the driver/passenger along the side 40 of the seat. When use is desired, the driver/passenger simply grasp the mirror housing with his/her hand and pulls the assembly up to the use position by swiveling the arm 20 in swivel mount 34 of the base 24. The mirror housing 16 is then swivelled or positioned on relative to arm 20 in order to position the mirror to individual preference.

In the preferred embodiment, the mirror will retain the selected position once set so that repeated movements of the assembly between the stowed and use positions do not require readjustment of the mirror. Also, in the preferred embodiment the arm 20 is made of a stiff, malleable material that may be bent by the user to further refine the position of the mirror for use. Once properly adjusted, the assembly will hold its shape until readjusted by the user.

As better shown in FIG. 2, the base 24 includes a pair of C-clamps 42, 44 adapted to secure the base to the posts 26, 28, respectively. In the preferred embodiment, the clamps 42, 44 are mounted in a slide track provided in the base 24. The clamps 42, 44 may be slidably moved into and out of engagement with the posts 26, 28 to properly secure the base and mirror assembly to the headrest. Once properly positioned the clamps may be held in place by set screws or by other means such as compression springs or the like. This allows the mirror assembly to be quickly secured to a variety of standard headrests.

Alternative mounting means may also be used such as the bayonet-type socket mount shown in FIG. 3. As there shown, the base end of arm 20 is mounted in a swivel or rotatable mount 50 which is carried in a receptive block 52. The outer end of block 52 includes a post 54 having locking pins 56, 58. The socket 60 includes a cylindrical receptacle 62 having pin-receptive slots 64, 66, whereby the entire assembly may be inserted in and locked in place in socket 60. The socket 60 is adapted to be mounted at a suitable location within the vehicle such as the side 40 of seat 12 or on the console between seats, by way of example. In many automobiles of European manufacture, the bayonet mount socket 60 is standard accessory equipment and the mirror assembly may be quickly mounted in such vehicles. In such applications, the socket is usually energized by the vehicle power supply as indicated by the electrical contact 68. The outer tip of post 54 also includes complementary electrical contact(s) 70. Flexible conducting wires 72, 74 carry the power to the mirror for energizing an illumination system having lamps 76 (see FIG. 4). For aftermarket systems, the bayonet type mount may be powered by a self-contained power supply such as battery 78 (see FIG. 3).

In the embodiment of FIGS. 1 and 2 the power supply is a self-contained unit such as the battery 80 carried in the battery compartment 82 of the base 24. The arm 20 is made of a hollow tube for carrying the conductive wires 72, 74 as shown in FIG. 3. An alternative power supply system is shown in FIG. 6, where the wires 72, 74 are carried in a flexible conduit 84 extending from the base 24 and terminating in a typical cigarette lighter jack 86, whereby the power may be supplied via the cigarette lighter socket of a typical vehicle. It is also possible to place the self-contained power supply such as battery pack 88 in a suitable battery compartment 90 provided in the mirror case 16.

As best shown in FIGS. 4 and 5, the mirror case 16 houses side lamps 76 behind a translucent lens 92 for providing illumination. A flip top 94 is hinged at 96 and is adapted to cover the mirror 14 when the mirror is in the stowed position. The top 94 may be spring loaded by a spring 98, whereby the top automatically opens when the latch 100 is released. In the preferred embodiment the latch 100 is a spring-loaded slide latch. It will be readily understood by those skilled in the arts that other latch mechanisms could be deployed without departing from the scope and spirit of the invention. The latch may also trigger the on/off switch for activating the illumination system of lamps 76, or an independent switch may be used. Also, where desired, switch could be activated by the pivot mount on the base 24, whereby the illumination system is activated by movement of the assembly from the stowed position.

In addition to the aftermarket system shown and described in detail herein it should also be noted that the mirror assembly may be permanently mounted in the vehicle as an original equipment accessory. While certain embodiments and features of the invention have been described in detail herein, it should be understood that the invention encompasses all of the modifications, improvements and enhancements within the scope and spirit of the following claims.

What is claimed is:

1. A vanity mirror assembly for a vehicle, comprising:

a. a mirror;

b. an elongated, flexible extension arm having one end adapted for receiving and supporting the mirror, the mirror being rotatable relative to the axis of the extension arm;

c. the arm having an opposite end adapted to be pivotably mounted on the vehicle and movable between a stowed position wherein the arm and mirror are a non-interfering position relative to operation of the vehicle and a use position wherein the mirror may be used as a make-up mirror by an occupant of the vehicle;

d. a base adapted to be mounted on the vehicle and wherein the opposite end of the arm is pivotably mounted in the base; and e. an illumination source for lighting the mirror, self-contained power supply located in the base, and wires extending the length of the arm for connecting the illumination source with the power supply.

2. The vanity mirror assembly of claim 1, wherein the vehicle includes a seat having a headrest mounted on a post extending from the top of a seatback, and wherein the base further comprises a clamp adapted to be secured to the post.

3. The vanity mirror assembly of claim 2, wherein the clamp further comprises a pair of opposed C-clamps adapted for securing the base to the post.

4. The vanity mirror assembly of claim 3, wherein said C-clamps are slidably mounted in the base.

5. The vanity mirror assembly of claim 4, wherein said C-clamps are spring loaded.

6. The vanity mirror assembly of claim 1, the base further comprising a bayonet type pin and wherein the vehicle further includes a bayonet type accessory socket for receiving and locking the bayonet type pin to secure the mirror assembly in place.

7. The vanity mirror assembly of claim 6, wherein the opposite end of the arm is secured in the bayonet type pin.

8. The vanity mirror assembly of claim 7, wherein the arm is mounted for rotation about the axis of the pin.

9. The vanity mirror assembly of claim 1, further comprising a housing, the mirror being further adapted to be mounted in the housing and the housing being adapted to mounted on the one end of the arm.

10. The vanity mirror assembly of claim 9, the housing further including a removable cover adapted to place in protective covering of the mirror when the stowed position and to be removed to expose the mirror when in the use position.

11. The vanity mirror assembly of claim 10, the housing further including a latch for holding the cover in place.

\* \* \* \* \*